United States Patent

Walker

[11] 3,891,317
[45] June 24, 1975

[54] PHOTOMETRIC DEVICE FOR PRINTER LIGHT SOURCE AND THE LIKE

[75] Inventor: Richard A. Walker, Woodland Hills, Calif.

[73] Assignee: Kollmorgen Corporation, Hartford, Conn.

[22] Filed: July 2, 1973

[21] Appl. No.: 375,802

Related U.S. Application Data

[63] Continuation of Ser. No. 204,820, Dec. 6, 1971, abandoned.

[52] U.S. Cl. ............... 355/68; 355/38; 356/222
[51] Int. Cl. ............................................ G03b 27/76
[58] Field of Search .............. 355/38, 68; 356/222; 95/10 C, 10 PO

[56] References Cited
UNITED STATES PATENTS

| | | | |
|---|---|---|---|
| 861,060 | 4/1969 | Moroney | 356/222 |
| 3,227,040 | 1/1966 | Dauser | 355/38 |
| 3,432,243 | 3/1969 | Hardesty | 356/222 |
| 3,583,816 | 6/1971 | Yuasa | 356/222 X |
| 3,619,071 | 11/1971 | Kimura | 356/222 |
| 3,690,241 | 9/1972 | Nomura | 95/10 C X |
| 3,708,676 | 1/1973 | Hubor | 355/38 X |
| 3,709,613 | 1/1973 | Zahn | 355/68 X |
| 3,741,088 | 6/1973 | Nabusawa | 356/222 X |

*Primary Examiner*—Samuel S. Matthews
*Assistant Examiner*—E. M. O'Connor
*Attorney, Agent, or Firm*—Edward F. Jaros

[57] ABSTRACT

A photometric device for measuring uniformity of illumination and color characteristics of light across an aperture area passing light from a light source, said device including an array of isolated light responsive elements and an associated calibration circuit for equalizing the output of each of said light responsive elements under conditions of uniform illumination. A photometer to measure illumination uniformity, average illumination, and color characteristics of light at a film gate of a continuous or non-continuous photographic or optical printer.

5 Claims, 6 Drawing Figures

PHOTOMETRIC DEVICE FOR PRINTER LIGHT SOURCE AND THE LIKE

This is a continuation of Ser. No. 204,820, filed Dec. 6, 1971, now abandoned.

BACKGROUND OF INVENTION:

The present invention is concerned with the control of photographic printers which are used to provide prints from film. It is desired that a printer be capable of producing acceptable prints in a consistent manner and that changes in the printing system which might affect the acceptable result can be quickly and readily ascertained so that needed correction or control may be made. Thus changes in illumination level, uniformity of illumination and color balance of the light source may result in unacceptable prints. Such changes which affect the light beam falling upon the film and print stock may include deterioration of the light source (namely a lamp), a change in characteristics of filters, heat absorbing glass or other associated optical elements. In addition exposure variation may occur because of minute differences in color characteristics of projector optical elements and the variation in coating of lenses.

Prior art proposed control systems for color printers have included a sensitometric method and a photometric method. The sensitometric system involved printing, processing, and evaluation of sensitometric strips exposed to the light source of the color printer and required from several hours to a whole day to determine the light characteristics of the printer beam. Thus such a method was extremely costly in terms of time and errors which resulted in waste film footage.

Prior proposed photometric methods include the use of an electro-optical instrument to measure the illumination level and uniformity and color balance. Presently available photometers have generally been inadequate for this purpose in terms of accuracy, stability, repeatability and dynamic range. Prior proposed photometers have included use of a barrier layer cell and galvanometer, a photo tube connected with an amplifier with a logarithmic response meter, and an adaptation of a color temperature meter. Such prior proposed photometers for use in controlling color printers were not adapted to precisely "see" light as the film "sees" light nor to detect an error, non-uniformity, or some irregularity in the light beam of the light source at the film gate or at the film plane.

In prior proposed mechanical scanning of a printer beam of light, a small photodetector or a fiber optics probe was used. A complex and awkward arrangement was required for such mechanical scanning, and such scanning devices usually lacked the ability to integrate all of the light to obtain an average illumination reading.

SUMMARY OF THE INVENTION:

This invention relates to a novel photometer constructed and arranged to measure at a film plane or at an light transmitting aperture illumination and color characteristics of the light beam at the aperture.

Therefore it is a primary object of the present invention to disclose a means for analyzing, evaluating and seeing light at a film plane whereby desired correlation between the light at the aperture and characteristics of the print stock may be readily achieved and standardized.

An object of the present invention is to disclose and provide a photometric device for evaluating the characteristics of light at the film gate of a printer wherein difference in illumination across the width or span of the film gate aperture is readily ascertained and measured.

Another object of the present invention is to disclose and provide a film gate photometer adapted to determine characteristics of incremental portions of the light across the width of the light beam to determine the uniformity of illumination and to selectively determine the average illumination across the light beam.

Another object of the invention is to disclose and provide a photometer as above mentioned wherein a plurality of independent isolated cells are arranged to respond to different portions of a light beam and wherein means are provided for calibrating the response of each cell to accurately calibrate said cells for uniform response to a light condition.

A further object of the present invention is to disclose and provide a photometric device for measuring illumination characteristics of light across a light beam or band and to determine color characteristics across said light band.

A still further object of the present invention is to disclose a novel arrangement for calibrating the response of each cell of a cell array and average response of such a cell array.

Other objects and advantages of the present invention include a novel construction for positioning a photometric probe at the film gate of an optical printer, means for collecting all of the light from the light source which passes through the film gate or aperture, means for determining light characteristics of a single cell or of all cells responsive to said light, and means for positioning a color filter between an array of cells and a light aperture to determine the color uniformity of the light at selected wave length bands.

Various objects and advantages of the present invention will be readily apparent from the following description of the drawings in which an exemplary embodiment of the invention is shown.

IN THE DRAWINGS

DETAILED DESCRIPTION

Figure 1:
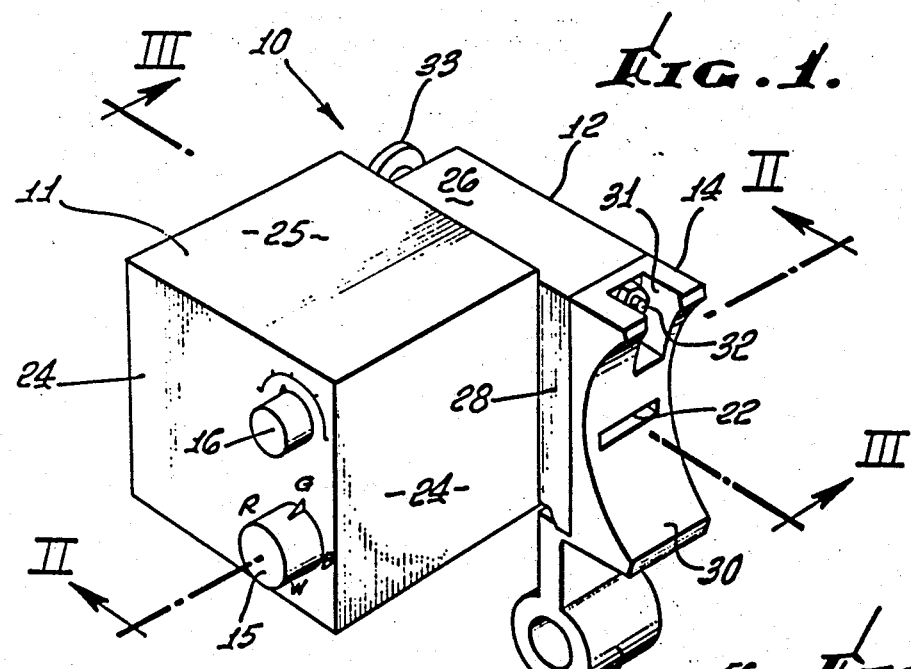
FIG. 1 is a perspective view of a photometric device including an adaptor for use with a continuous color printer and embodying the present invention.
Figure 2:
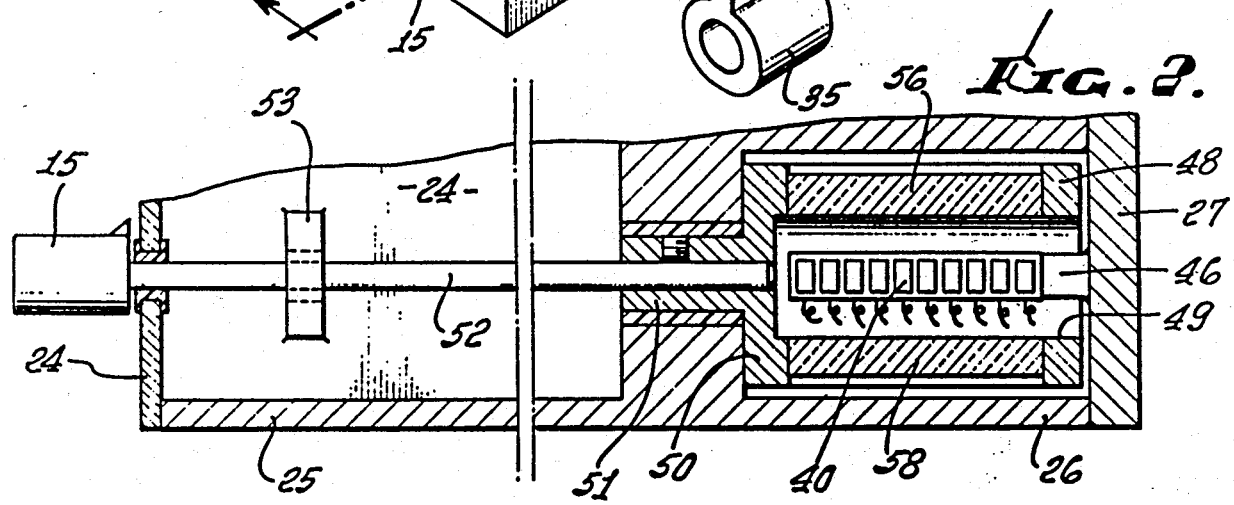
FIG. 2 is an enlarged sectional view taken in the plane indicated by line II—II of FIG. 1.

A photometric device embodying this invention is generally indicated at 10 in FIG. 1. Device 10 may include a housing 11 of generally cubic form and having associated therewith along one side an auxiliary housing 12. Auxiliary housing 12 provides a mounting for an adaptor probe 14 which is configured for correlation with the associated external surface of a color printer of continuous type, a concave surface on the adaptor having a slit-type aperture means 17 therein and lying essentially along the path of a film from which a print is to be made. Housing 11 may carry on the wall opposite to auxiliary housing 12 a control knob or means 15 for selecting red, green, blue filters for interpositioning thereof in the path of the light of the printer light source. Above control knob 15 may be a second control means or knob 16 for selecting sequentially or in any desired order one of a plurality of light responsive means or photo detectors including photo cells in a cell array mounted in auxiliary housing 12 in light receiving position for light passing through aperture means 17 provided in the adaptor. Various external configurations of adaptor 14 may be utilized for precisely positioning device 10 in proper relationship with an aperture through which light from a light source is emanating.

In the present example of the invention, adaptor probe 14 is designed for use with a continuous color printer, such as a Bell & Howell Model C Printer. In such a color film printer, a light source 20 emits a printing light beam 21 through a narrow slit-like exit port 22 approximately 1 inch wide for use with 35mm motion picture film. In a continuous contact printer, uniformity of illumination in a vertical direction or lengthwise of the film is not required because the exit port of the printing light beam has a very small vertical dimension. However, in non-continuous contact printers, the exit port for the printer light beam has a substantial vertical dimension as compared with the horizontal or transverse dimension and in such instance, uniformity of illumination in a vertical plane is required as later described in a modification of the present invention.

Housing 11 includes side wall 24 and top and bottom walls 25 of any suitable material and construction. Auxiliary housing 12 may include top and bottom walls 26 and a side wall 27 and a side wall extension 28. Front wall 29 provides a suitable surface against which adaptor probe 14 may be mounted as later described. It should be noted that the housing 11 and auxiliary housing 12 are so arranged that the photometric device may be used to mount different adaptor probes as required to conform to the configuration of different types of continuous printers. Thus while the example of this invention is described with respect to one type of continuous printer, it will be understood that it may be used with other types of continuous printers by modifying the external configuration of the adaptor probe 14.

Adaptor probe 14 includes entrance aperture means 17 positioned in close registration with exit port 22 of the printer. Adaptor probe 14 may be made of any suitable material and is provided with a concave front surface 30 adapted to conform to a corresponding convex surface formed on an optical printer. Adaptor probe 14 includes a bottom extension 35 which may be associated with a pressure roller shaft (not shown) on the printer in order to properly position the adaptor probe 14 on the printer with respect to the exit light port and without housing 11 and 12 attached thereto.

Another probe 14 is mounted on the printer with aperture means 17 accurately aligned and registered with the exit port of the printer, housings 11 and 12 may be connected to probe 14 by interlocking bottom rib 36 in recess 36a on the back face of probe 14 adjacent extension 35. Adaptor probe 14 includes at its top a suitable shouldered recess 31 which may receive one end of a securement screw 32 having an enlarged head 33 whereby the adaptor may be firmly positioned and retained against front wall 26 of housing 12.

Figure 3:
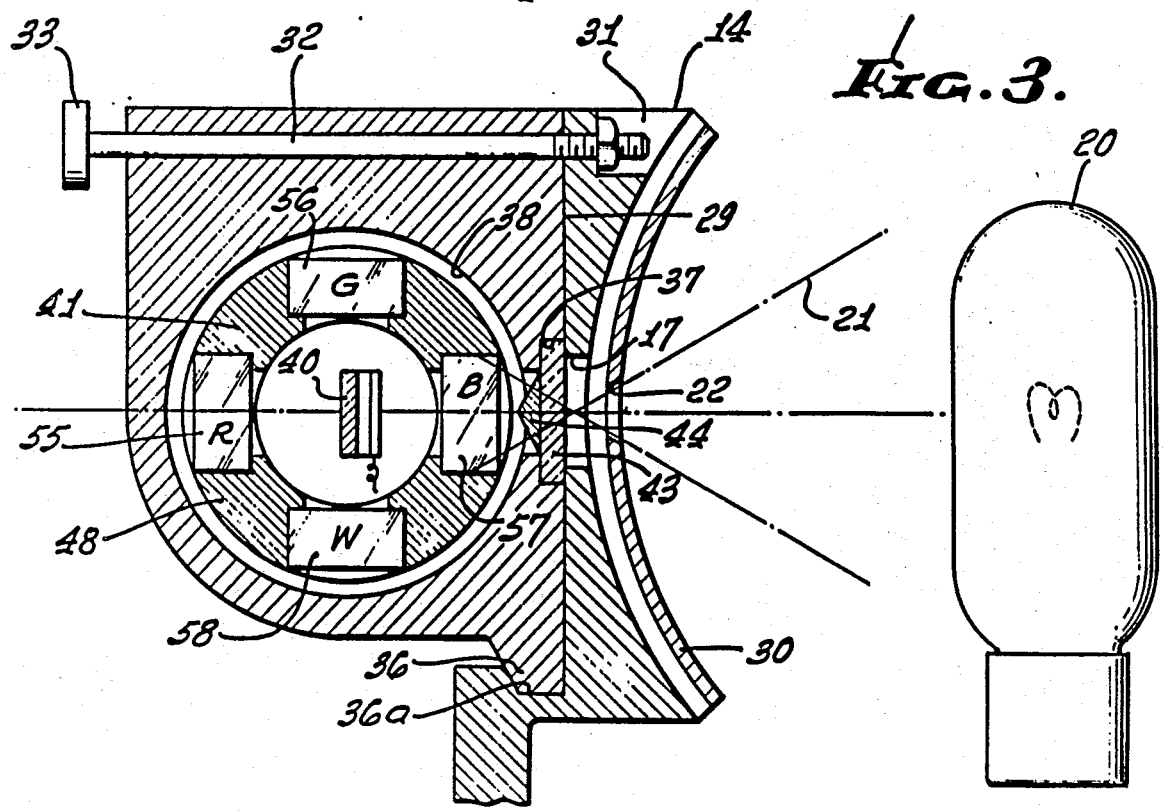
FIG. 3 is a fragmentary enlarged sectional view taken in the plane indicated by line III—III of FIG. 1.

Front wall 29 of auxiliary housing 12 may be provided with a transverse opening 37 of stepped configuration, the enlarged outer portion being slightly greater in width than aperture means 17 of the probe 14 and the inner portion being slightly less in width than the aperture means 17. Opening 17 communicates with a generally hollow chamber 38 provided in auxiliary housing 12 in which is mounted cell array means 40 and a light modifying or filter cylinder means 41. As shown in FIG. 3, opening 37 is covered by an infrared ray suppressor filter 43 to suppress the response of the photometer to infrared rays as described later. On the inner surface of filter 43 may be attached a bi-prism 44 of Fresnel type. Bi-prism 44 serves to gather light leaving the printer exit port 22 and to image said light on the cell array 40. Bi-prism 44 thus serves as a condensor or relay lens and collects extremal rays of light passing through printer exit port 22 to assure that the cell array sees all of the light which will be seen by print stock during a continuous printing operation. It is also important to note that the bi-prism 44 serves to mix light beams in a vertical plane passing through the aperture means 17 thereby minimizing errors which might occur because of local variations in sensitivity in a vertical direction of the cell array 40. The bi-prism serves to integrate the light of the printer beam in vertical planes while leaving undisturbed and unaffected the light distribution in horizontal planes.

The light responsive means, photodetector elements, or plurality of cell arrays 40 corresponds in rectangular configuration to printer exit port 22 and may be slightly greater in the vertical dimension. Cell array 40 may comprise a linear array of small electrically isolated or segmented photodetectors or photosensors. In this example, ten photodetector cells are shown to provide ten adjacent incremental samples of the light beam across exit port 22. Each cell preferably may comprise a silicon photovoltaic cell having excellent stability, linearity, lack of hysteresis and fatique, adequate and constant light sensitivity and spectral sensitizing. Such a silicon voltaic cell made with low resistivity (in the order of 10 to 100 ohms) silicon may include an active area of 0.4 by 1.0 inches and segments thereof may be 0.1 inches in width. The 1.0 inch dimension corresponds to maximum width of an exit port of a 35mm printer.

Cell array 40 may be carried by an internal support member 46 carried by wall 27 of auxiliary housing 12 and which may be secured in such position in any suitable manner. In FIG. 3, it will be noted that the cell array 40 is positioned along the axis of the filter assembly 41 and slightly forwardly thereof in the direction of aperture means 17.

The filter assembly 41 may comprise a hollow cylinder 48 having an open end 49 and a closed end 50 having a suitable hub 51 for mounting cylinder 48 on a rotatable selector shaft 52 which may be carried by wall 24 of housing 11 and by an internal support 53 provided on side wall 24. The outer end of shaft 52 carries selector knob 15 by which the filter assembly may be rotated to selectively position a light modifying filter or clear opening in the path of light exiting from bi-prism 44.

In this example, light modifying means carried by filter assembly 41 may include a red filter 55, a green filter 56, a blue filter 57 and a neutral or transparent clear glass 58. The respective filters are mounted in cylinder wall 48 in approximately 90° spaced relation and may be thus selectively interposed between cell array 40 and bi-prism 44 by turning the assembly 41. The color filters 55, 56 and 57 are selected to transmit selected wave-length bands which will modify the spectral response of the cell array 40 to match that of a selected print stock. The spectral response of the cell array, therefore, may be correlated directly with the spectral response of print stock in a given printer and a photometric standard may thus be determined by photometer 10 so that a standard on one printer may be transferred and used to control an entire group of similar printers using the same print stock.

Figure 4:
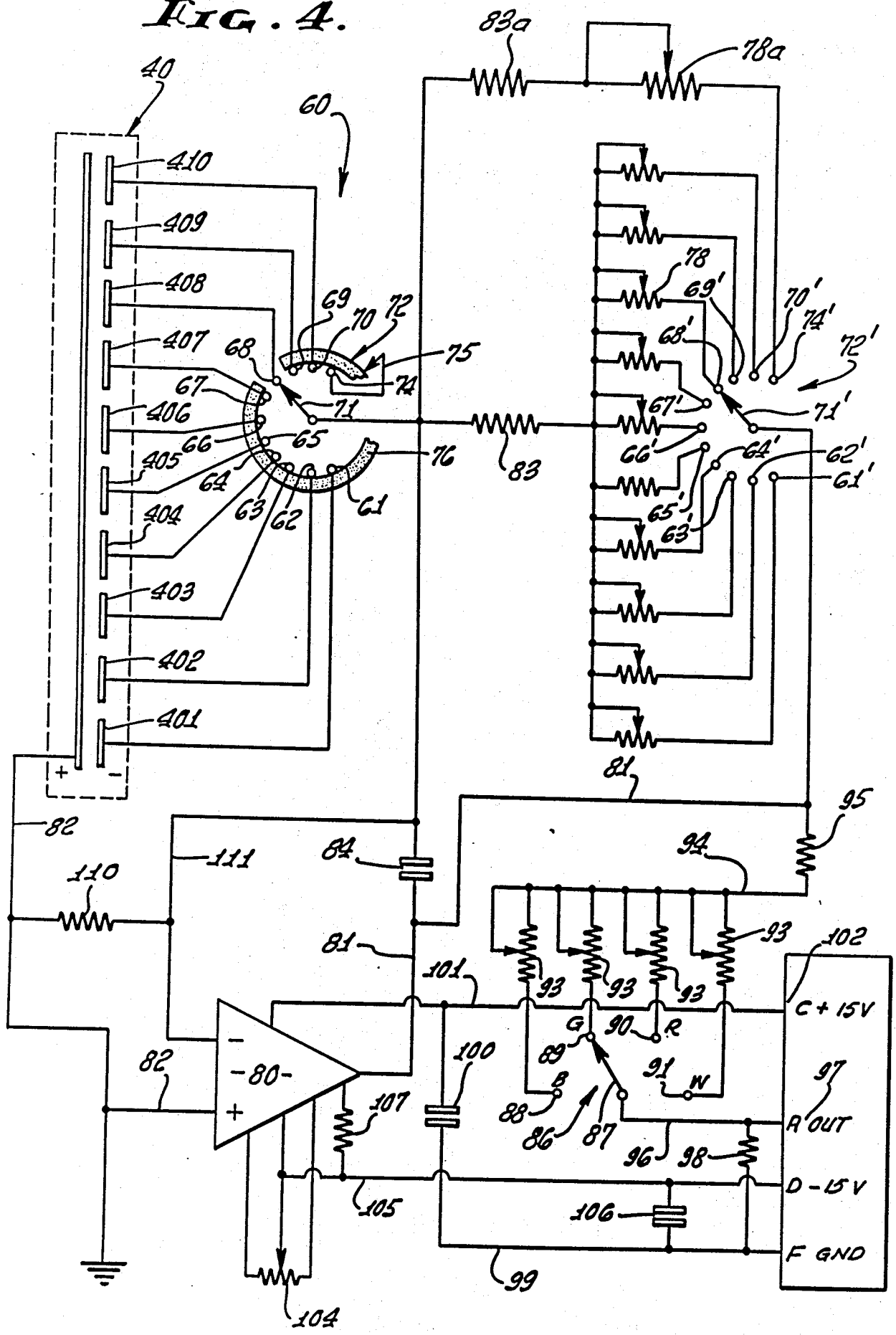
FIG. 4 is a schematic circuit diagram illustrating a calibration circuit for use with the device shown in FIG. 1.

Means 60 for calibrating the output of the cell array 40 is illustrated in FIG. 4. Since a multiple segment photodetector is employed to sample selected incremental areas of illumination across the light path of a continuous printer light source, it will be understood that each cell may differ in response from its average or ideal response. For example, the cell responsively, that is, signal-out to light-input ratio may differ, the cell characteristics at zero or low light levels may be different, and at higher light levels a light saturation condition of the cells may occur. Such differences in nonuniformity of response of cells in the array may be due to manufacturing conditions or other causes. Photodetectors may be selected with low internal resistance to minimize saturation errors, all output being limited at high light levels by internal resistance of the cell. Zero offset may be minimized by suitable external circuitry, as by using photodiodes in the short-circuit current mode. Inherent responsivity may be compensated by a separate electric gain or trim control for each cell segment. It is important to eliminate from the photometer and from the output of each cell in the array any differences in the response of that cell to a selected sample light beam and the response of the adjacent light cell to a similar beam. The photometer may be calibrated so that each cell and its signal output is adjusted to a standard so that upon completion of adjustment, uniformity of illumination of a light beam passing through the exit port may be determined.

In FIG. 4, such an exemplary calibration circuit is shown, the several cells being generally indicated at 40 and may comprise individual cells 401 to 410 inclusive. Each of the cells is connected to its respective switch contact 61-70 inclusive for selection by moving a switch arm 71 of a rotary switch means 72 which is associated with scan selector knob 16 to sample incremental portions of light across exit light port 22.

In addition to the individual switch contacts 61-70 inclusive, switch means 72 may also engage a contact 74 which is connected (as schematically illustrated) by line 75 and annular contact ring 76 in parallel to each of the cells 401-410 inclusive so that average illumination of the entire light beam passing through exit port 22 may be obtained.

Switch means 72 may be provided with a second rotary switch deck generally indicated at 72'. Upon selection of a cell by switch arm 71 a corresponding switch arm 71' (as schematically shown) will contact a switch terminal 68' connected in the cell circuit with a potentiometer 78 by which the output of the cell may be adjusted for variations in its responsivity. Each of the circuits for the cells 401-410 inclusive, includes such a potentiometer 78 whereby cell variations may be adjusted so that each has an equal uniform output. It will be noted that the switch means 72' also includes a terminal 74' including an adjustable potentiometer 78a in its circuit for adjusting the average output to a standard to obtain average illuminance of the entire cell array.

Each cell, for example cell 408, is thus connected directly through terminal 68 and switch arms 71 and 71' to a solid state integrated circuit amplifier 80 by lead line 81. The cell array is also connected to amplifier 80 by lead line 82. Since the average illuminance reading is made by totaling the outputs of all the individual calibrated cells and the total output results in a larger signal, the feedback resistance of amplifier 80 is modified by resistances 83 and 83a. A capacitor 84 is connected between lead 81 and 111.

Control knob 15 is associated with a switch means generally indicated at 86 which includes switch arm 87 for selected contact with terminals 88, 89, 90 and 91 to calibrate variations in responsivity through each of the color filters, blue, green and red, and clear or white. Each terminal 88-91 is connected to its associated adjustable potentiometer 93, each of which is connected through line 94 and resistance 95 to lead 81, so that the output of each of the cells, as adjusted by potentiometers 78, may be further adjusted to the spectral response of the light through a selected filter. Switch arm 87 is connected through lead 96 to signal output means 97. Lead 96 may also be connected to a resistance 98 connected with lead 99 having a capacitor 100 connected to lead 101 providing an output at 102 from amplifier 80. Amplifier 80 may be connected to a potentiometer 104 connected to lead 105 to which a capacitor 106 is connected across leads 99 and 105. A resistor 107 may be interposed between lead 105 and amplifier 80. The output signal from amplifier 80 is transmitted to suitable read-out circuitry and to a suitable meter (not shown) which indicates the illuminance and spectral responsivitity of each cell or cell array as selected.

At low light levels voltage offsets may occur due to cell to cell variations in the dark resistance of the photodetector, and since such voltage offsets may differ from one cell to another cell, erratic readings may occur at low light levels. In order to eliminate such voltage offset variations, a resistance 110 may be interposed between lead 82 from cell array 40 and lead 11 which is connected to the input side of the amplifier. Resistance 110 presents a constant low impedance to the input of the amplifier which eliminates such variations. The value of resistance 110 may be in the order of 1k to 100k ohms, and with the particular photodetectors and amplifier employed in an existing system a resistance of approximately 5k to 10k has been found optimal.

The calibration circuit shown in FIG. 4 is exemplary; other circuits may be employed to produce the same result. It is important to note, however, that variations in responsivity of each of the photodetector cells 401-410 inclusive may be individually adjusted to compensate for variations within the electrical and optical system of device 10, not only with respect to illumination, but also with respect to color characteristics of the light impinging upon the photodetector cells.

Figure 5:
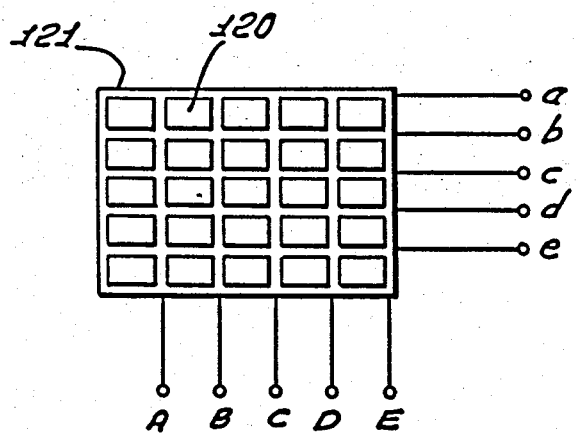
FIG. 5 is a schematic view of a modification of the cell array used in this invention for non-continuous printers.
Figure 6:
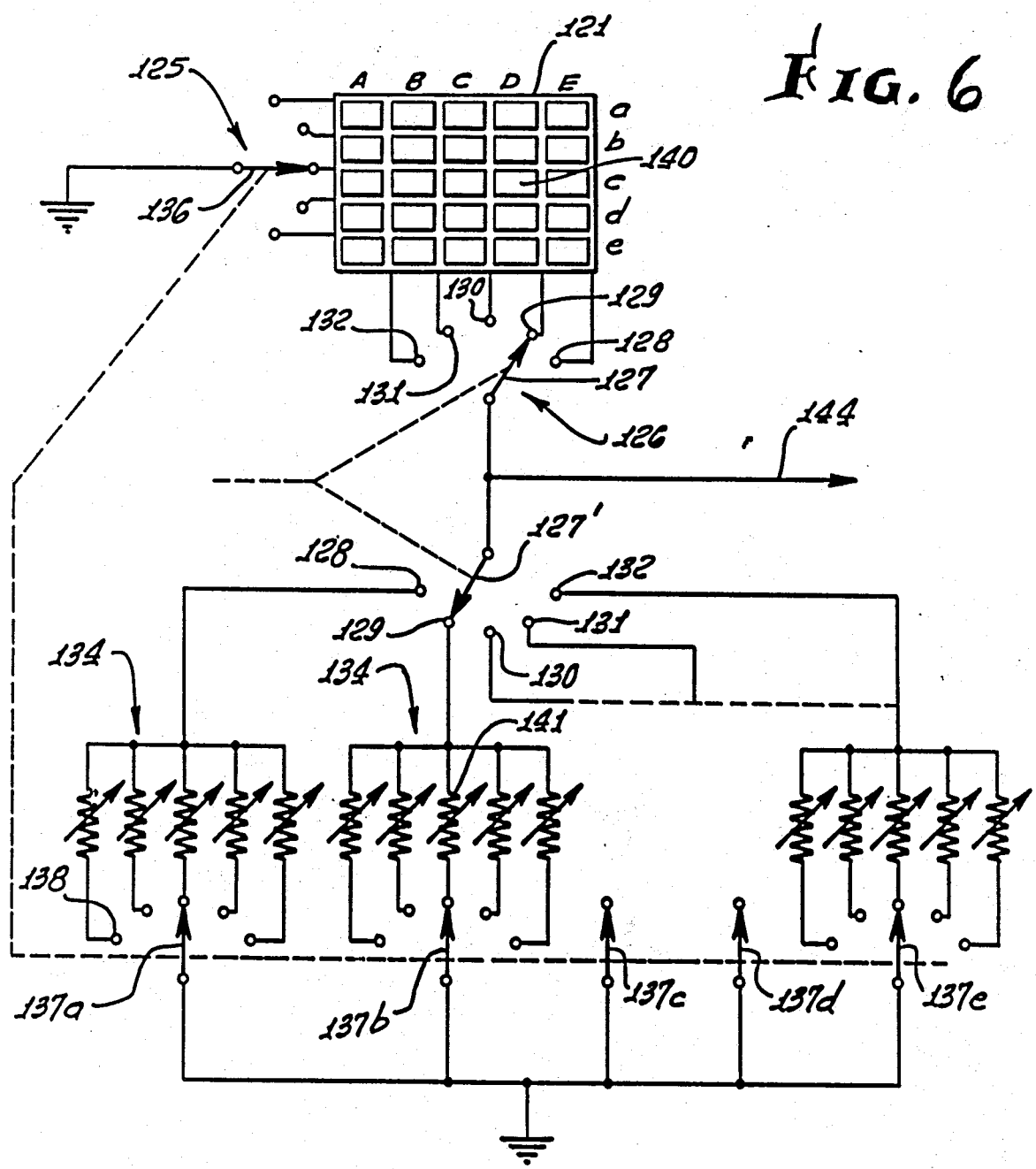
FIG. 6 is a schematic view of a calibration circuit for use with the cell array of FIG. 5.

In the embodiment described above the linear type of cell arrangement is particularly adapted for use with a continuous printer. For non-continuous printers and other optical devices, where it is important to measure uniformity of illumination in two dimensions, a rectangular photodetector means may be used as illustrated in FIGS. 5 and 6. In FIG. 5 a typical photodetector cell array is illustrated for a 35 millimeter optical printer in which the isolated cells 120 are arranged in horizontal rows a, b, c, d, and e, and in vertical columns identified as A, B, C, D, and E. Thus, a 35 millimeter printer aperture of 0.74 × 0.98 inches will be divided into 25 incremental areas to be sampled. The rectangular cell array means 121 may be positioned at the printing aperture by an adapter probe constructed so that the cell array is positioned to receive all of the light passing through the printer aperture.

A calibration circuit means is exemplarily partially illustrated in FIG. 6 for the rectangular cell array means 121, and briefly comprises a row switch means 125 for selecting one of the rows a, b, c, d, and e, and a column switch means 126 for selecting one of the columns A, B, C, D and E. Column selector switch means may include a switch arm 127 which is correlated with a corresponding switch arm 127' adapted to contact corresponding column terminals 128, 129, 130, 131 and 132, each of which terminals are connected to a set of five adjustable potentiometers generally indicated at 134. The potentiometer means 134 includes a potentiometer for each of rows a, b, c, and d and e, to which switch arm 136 of row selector switch means 125 may be connected to respective switch arms 137a, 137b, 137c, and 137e, each of which are adapted to contact a selected terminal 138 of a potentiometer in the potentiometer means 134 corresponding to the column selected. Thus, as illustrated, row selector switch 125 in contact with row c, while column selector switch 126 is in contact with row D. Thus the photo cell being calibrated is that cell indicated by 140 and the potentiometer for such calibration is indicated at 141.

FIG. 6 does not illustrate the calibration circuit for the color filter means, but it will be apparent from the illustration shown in FIG. 6, that a similar column and row selector switch means may be utilized with suitable potentiometers for determination of the color characteristics of light of an exemplary cell such as 140.

The output of the cells is generally indicated by arrow 144 which leads to amplifier circuitry similar to that shown in part of FIG. 4 and then to suitable readout circuitry and meter (not shown).

It will be understood that light passing through an aperture of a non-continuous printer or other optical device may be incrementally measured by the provision of the rectangular cell array such as 121. While 25 incremental areas have been indicated in the example, more or less incremental areas may be measured depending upon the analysis of the light desired. For example, the rectangular array may be made with ten cells in a row, and ten cells in a column to provide an analysis of 100 different incremental areas of the light passing a selected aperture.

In the operation of the device 10 with a continuous printer as first described, adaptor probe 14 may be properly located with respect to the exit aperture of a continuous printer so as to position the cell array 40 and the filter cylinder 41 in light receiving relation with respect to the exit port of the printer. The device 10, having been previously calibrated so that the response of each cell to a selected light beam will be uniform, both with respect to radiance and with respect to color, will then view or see the printer light as if it were print stock. In the event uniform illumination across the printing exit port is not present, the amount and location of such variance from uniform illumination is rapidly determined by obtaining the response of each cell to the light across the exit port and by obtaining the average illuminance across the exit port. In the event illumination is not uniform, the light source or other causes of non-uniform illuminance may be corrected.

The desired uniformity of illumination is correlated to the sensitivity and color balance of print stock, thus if more than one printer is being used with the same print stock, the several printers may be adjusted by the use of device 10, so that a standard illumination will be available across the printer apertures of each of the printers.

It will be understood that the response indicating means is direct reading, that is, the light levels are read without reference to a standard light source and that they may be read from a scale divided in printer points (an exposure difference of 0.025 log-exposure units).

The advantages of the photometric device 10 will be readily apparent from the above description with respect to the daily control and maintenance of uniform color balance and exposure and when using one or more printers or various different print stock.

All modifications and changes coming within the scope of the appended claims are embraced thereby.

I claim:
1. In combination with an optical printer having a light source and having an exit port transmitting unmodified light from said source for exposure of print stock to be later located at and covering the plane of said port:
   an electro-optical device for measuring characteristics of light transmitted through and at said plane of said uncovered exit port and in the absence of print stock comprising
   a photometer means and an adaptor means for operatively associating said photometer means with said optical printer;
   said adapter means including an entrance aperture alignable and in proximate relation with the plane of said exit port to receive and pass all of the light transmitted through the uncovered exit port;
   said photometer means including
   a biprism elememt at said entrance aperture to collect and reimage all of said light passing through said uncovered exit port;
   a photovoltaic cell means including a plurality of separate electrically isolated cell elements in proximate relation to receive and respond to all of said light transmitted by said prism element in reimaging light at said exit port on said cell means;
   each of said cell elements having an area responsive to light transmitted through corresponding incremental areas of said exit port and said entrance aperture;
   and circuit means connected with each cell element and having switch means to independently select the response of each cell element and to summate response of all of said cell elements;
   said cell elements being calibrated to respond equally to a selected light source whereby differences in response of each of said cell elements correspond to differences in characteristics of light passing through the incremental areas of said exit port and entrance aperture.

2. In a combination as stated in claim 1 wherein said calibrated cell elements produce equal output signals for conditions of uniform illumination across said aperture by said light transmitted therethrough from said uncovered exit port,
amplifier means for said output signals,
and a resistor in parallel with the input to said amplifier means.

3. In the combination as stated in claim 1 wherein said photovoltaic cell means are of low resistivity in the order of 10 to 100 ohms;
and wherein said circuit means includes resistance means for offsetting variations in cell voltages at low light levels.

4. In the combination as stated in claim 1 including a switch means connected to said plurality of cells for averaging the illumination characteristics of light falling on all of said cells.

5. In a photometer for measuring illumination characteristics of unmodified light transmitted through an entrance light port of selected area, the unmodified light emanating from a light source spaced from said entrance port, the combination of:
said entrance light port having an area transmitting all wave lengths of light from said light source;
a plurality of photovoltaic cells of low resistivity in the order of 10 to 100 ohms positioned in spaced proximate relation to said entrance light port, each of said cell elements having an area responsive and corresponding to light transmitted through a corresponding incremental area of said entrance light port;
each of said photovoltaic cells being independently responsive to light impinging thereon from said entrance light port;
circuit means for selectively determining the response of each of said cells and the response of all of said cells to illumination characteristics of light passing through said entrance light port,
said circuit means including resistance means for offsetting variations in cell voltages at low light levels;
and a biprism means adjacent to said entrance light port to collect and direct light transmitting by said entrance port to a confined path and to reimage all of the light passing through the entrance light port on the plurality of cells;
said circuit means including means for calibrating the response of each photovoltaic cell to a selected light condition to assure equal output signals for determining conditions of uniform illumination by said light at said entrance light port,
said calibrating means including
an amplifier means for said output signals, and
a resistor in parallel with the input to said amplifier means.

* * * * *